United States Patent
Kendall

Patent Number: 5,463,945
Date of Patent: Nov. 7, 1995

[54] PORTABLE TRIPOD RISER

[76] Inventor: Charles S. Kendall, 6553 Kelsey Point Cir., Alexandria, Va. 22315

[21] Appl. No.: 205,545

[22] Filed: Mar. 4, 1994

[51] Int. Cl.$^6$ .................................................. A47B 57/00
[52] U.S. Cl. ................................ 108/59; 108/38; 108/115
[58] Field of Search .................................... 108/59, 33, 34, 108/35, 37, 38, 41, 115, 128

[56] References Cited

U.S. PATENT DOCUMENTS

| | | | |
|---|---|---|---|
| 633,203 | 9/1899 | Makinen | 108/36 |
| 900,552 | 10/1908 | Kade | 108/115 X |
| 1,323,080 | 11/1919 | Mante | 108/41 |
| 1,455,569 | 5/1923 | Caminoni, Jr. | 108/41 |
| 1,722,521 | 7/1929 | Hiatt . | |
| 2,625,352 | 1/1953 | Sykes et al. . | |
| 3,080,193 | 3/1963 | Nimmo | 108/115 X |
| 3,188,158 | 6/1965 | Sanchez | 108/38 X |
| 4,015,806 | 4/1977 | Cattermole . | |

FOREIGN PATENT DOCUMENTS

| | | | |
|---|---|---|---|
| 1522560 | 4/1968 | France | 108/115 |
| 0290468 | 5/1991 | Germany . | |

Primary Examiner—José V. Chen
Attorney, Agent, or Firm—Randy W. Lacasse

[57] ABSTRACT

A tripod is elevated off the ground and supported by a three legged unit so that when opened it cradles the legs and/or the spreader of a tripod. The legs of the unit are hinged together along the spinal edge allowing the unit to fold close in a book-type manner. Attached to the unit is a platform leaf for the purpose of supporting a tripod operator. The platform leaf is supported by hinges attached to the top edge of one of the three legs and also by retractable folding legs. The retractable folding legs collapse to a position parallel to the platform leaf and the platform leaf collapses to a position parallel to the legs allowing the entire unit to be easily folded for compact transportation.

12 Claims, 3 Drawing Sheets

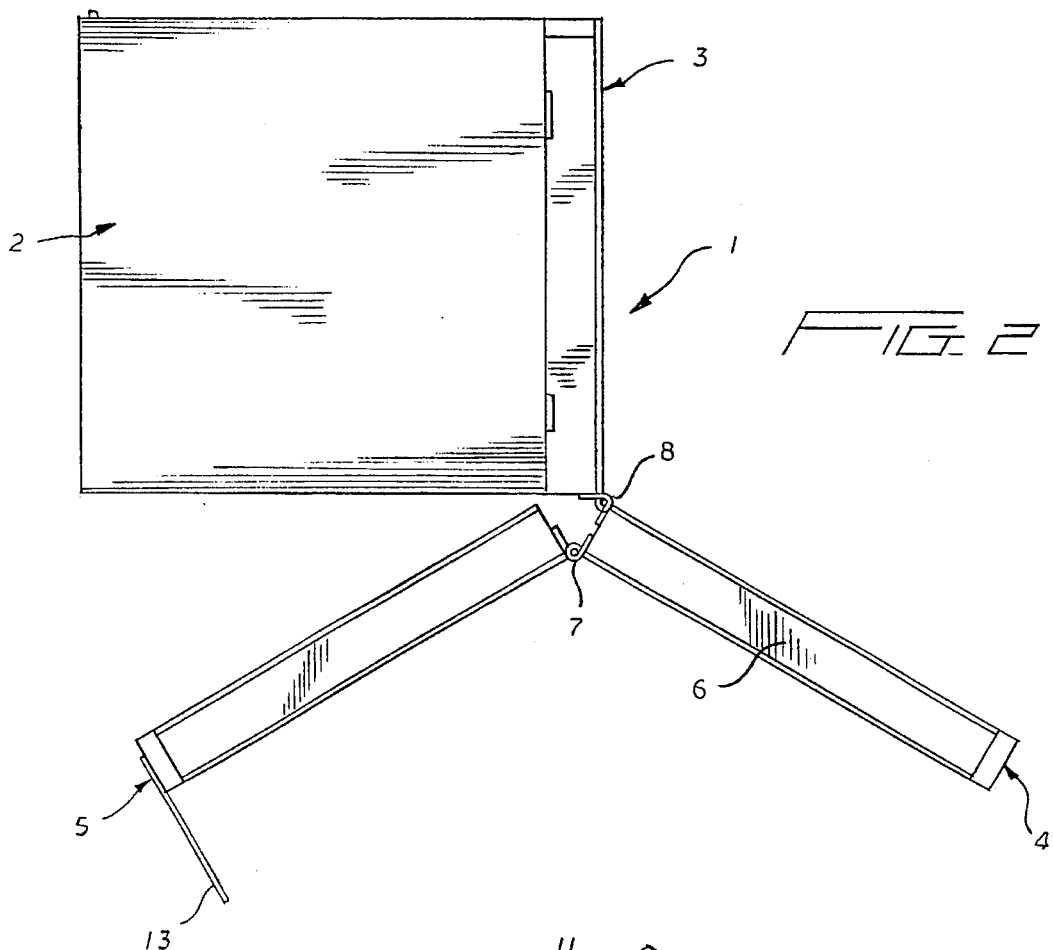
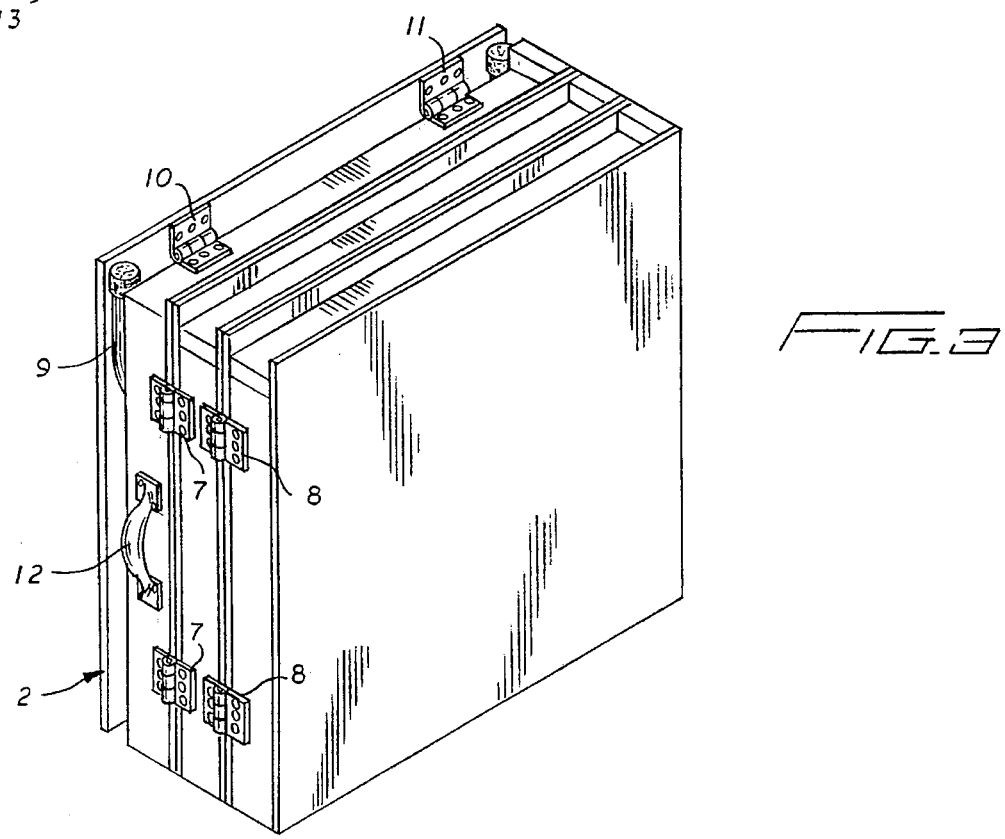

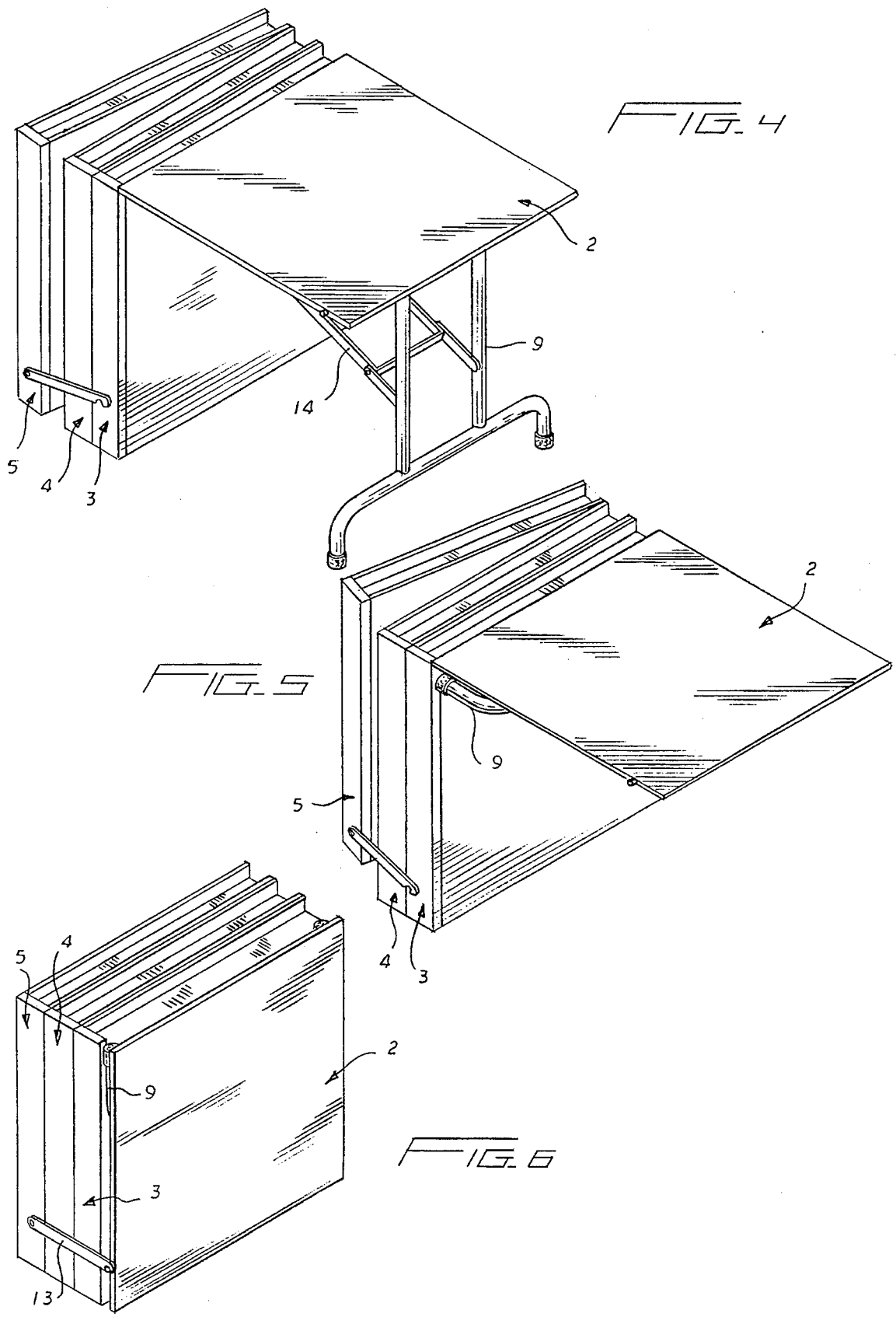

5,463,945

PORTABLE TRIPOD RISER

BACKGROUND OF THE INVENTION

1. Field of Invention

This invention generally relates to instrument supporting platforms and more specifically is directed a portable riser to support and raise the elevation of tripods.

2. Discussion of Prior Art

When using a tripod to support an instrument, such as a camera, it is often desirable to raise the elevation of the tripod, and thus the camera, to achieve a more aesthetically pleasing picture. While most tripods have adjustable legs for the purpose of adjusting the instrument height, their maximum elevation is often limited to around five feet. Additionally, most individuals using the instrument mounted to the tripod cannot comfortably operate the instrument at elevations above five feet.

Conventional hotel type platforms, usually 8'×4', can sometimes be used to raise the tripod and operator to a higher elevation, however, these platforms are not very portable, extremely heavy, and consume a large amount of space in work environments where space is at a premium.

OBJECTS OF THE INVENTION

It is an object of this invention to provide for a portable tripod riser that, once set-up, supports and raises the elevation of an instrument supporting and/or an operator. Another object of the invention is to provide a riser that is portable and easily set-up by the operator. A further objective of the invention is to provide a tripod riser that consumes less space than traditional platform risers.

SUMMARY OF THE INVENTION

A portable riser includes three vertical support legs hinged together allowing them to open and close in a book type manner. When opened the three legs form a three pointed star. When closed, the legs are folded together for portable storage and transporting. Attached to the top edge of one of the legs is a platform leaf. The platform leaf is hinged and swings upward to create a standing area for the instrument operator. A set of folding legs opens downward underneath the platform leaf for support.

Other objects and advantages of the invention will become apparent upon reading the following detailed description and upon reference to the drawings.

BRIEF DESCRIPTION OF THE DRAWINGS

FIG. 2 is a top view of the invention with the legs and platform leaf spread to their operating position.

FIG. 3 is a perspective view of the tripod riser fully closed showing the hinges 7 and 8 attaching legs 3, 4, and 5 and carrying handle 12.

FIG. 4 is a perspective view of the tripod riser partially closed with the platform leaf 2 and retractable folding legs 9 opened to the operating position legs 3 and 4, folded to the closed position and leg 5 partially opened.

FIG. 5 is a perspective view of the tripod riser partially closed with the platform leaf 2 opened to the operating position but the retractable legs 9 and legs 3 and 4, folded to the closed position and leg 5 partially opened.

FIG. 6 is a perspective view of the tripod riser fully closed with the platform leaf 2, retractable folding legs 9, and legs 3, 4, and 5 folded to the closed position and secured with lock pin 13.

DESCRIPTION OF THE PREFERRED EMBODIMENTS

Figure 1:
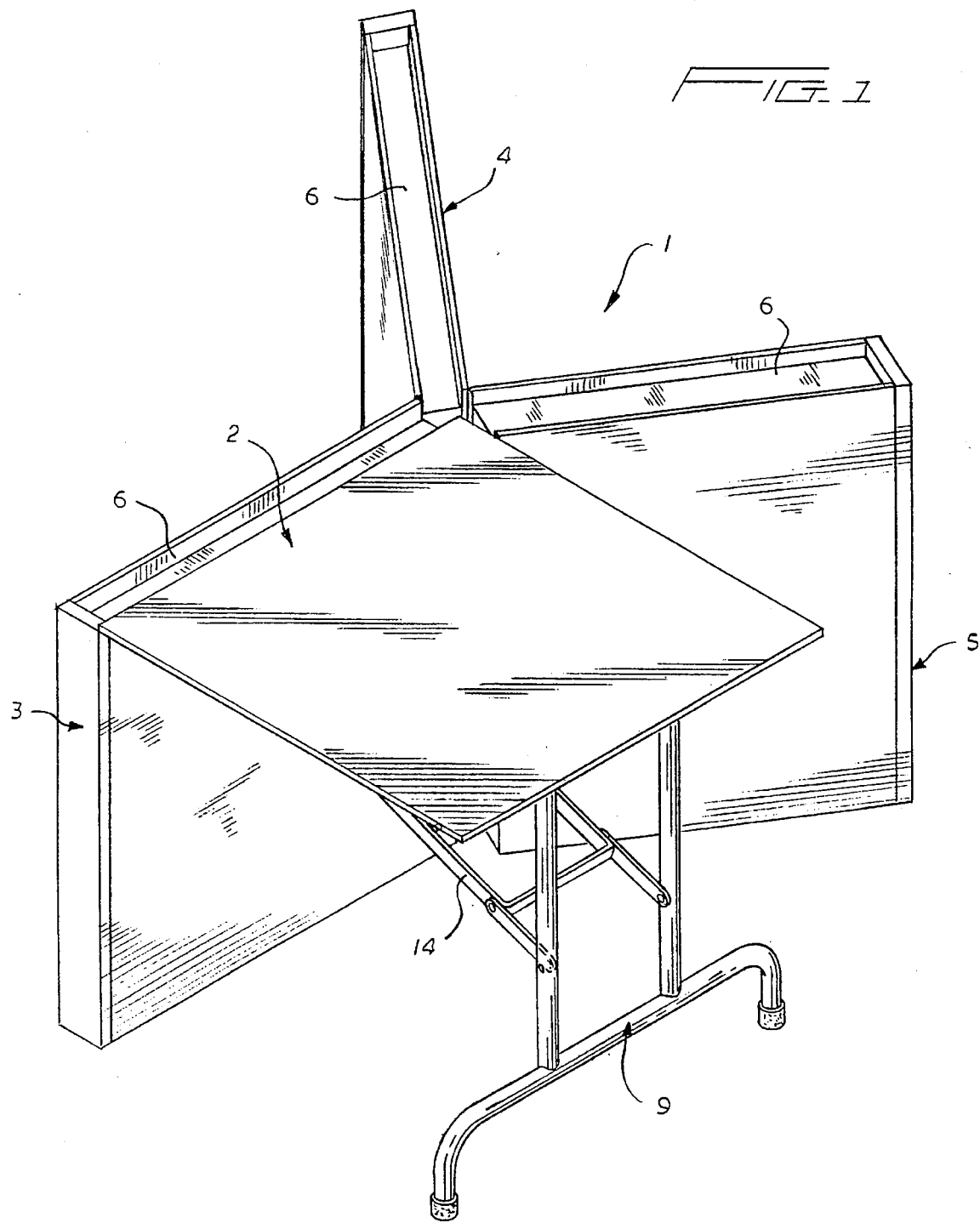
FIG. 1 is a perspective view of the tripod riser with the legs 3, 4, and 5, platform leaf 2, and retractable legs 9 opened to their operating position.

While the invention will be described in connection with preferred embodiments, it will be understood that I do not intend to limit the invention to these specific embodiments. On the contrary, I intend to cover all alternatives, modifications and equivalents as may be included within the spirit and scope of the invention as defined by the appended claims.

Turning to the drawings, there is shown an instrument support device 1 having a platform leaf 2, which is supported, in part, by one of three legs 3, 4, and 5. Preferably, all three legs are identical, and therefore only leg 3 will be described in detail.

Leg 3 is formed in a thin box-type manner approximately 2'×2'×3" and contains a small well section 6 along the top edge. The well is approximately 1" deep and is intended to hold any tripod and/or tripod spreader in place when set-up.

The inside edge of each of the legs 3, 4 and 5 is hinged by 7 and/or 8 to the next adjacent leg (see FIG. 3). The hinges allow the unit to be folded in a book type manner for transporting and storage. The outside edge of leg 5 is not hinged to the outside of leg 3. This allows leg 5 to swing approximately 240° to close against leg 4 and leg 3 opposite the platform leaf 2.

The platform leaf 2 is a sturdy flat surface approximately 2'×2'×¾" and is supported by a set of retractable folding legs 9 approximately 23" in height and hinges 10 and 11 along the top edge of leg 3. The platform should be strong enough to support at least 100–300 pounds. The legs lock in a fully extended position using brace 14 in a conventional and well known manner. The hinges allow the platform leaf 2 to collapse into a folded position whereby the platform leaf 2 swings down and rests parallel to leg 3. The retractable folding legs 9 support the platform leaf 2 from the side of the platform leaf opposite leg 3.

To collapse the platform leaf 2, the retractable folding legs 9 release from their locked position and fold under platform leaf 2 (see FIG. 5). Once the retractable folding legs 9 are locked in their folded position, the platform leaf 2 swings down to a vertical position parallel to leg 3 (see FIG. 6).

With all three legs 3, 4, and 5 folded in the book-type manner and the retractable folding legs 9 and platform leaf 2 also collapsed into the folded position as in FIG. 6. The portable tripod riser stands approximately 2'×2'×11" and can be secured for travel or storage by latching these parts with a conventional recessed hasp or pin securing device 13 as is known in the art. The portable tripod riser can easily transported by hand by using handle 12 located on the side edge of leg 3.

In operation a user would:

1. transport the device to a location to be used;
2. unlatch pin 13;
3. raise platform 2;
4. unfold legs 9;
5. lock into place by pushing down on brace 14;
6. sequentially unfold legs 5, 4 and 3;
7. space legs approximately 120° apart;

8. mount tripod legs in recess well 6, and 9. stand on platform 2 to operate equipment attached to tripod.

When finished the steps would be performed essentially in reverse to close and transport the device.

CONCLUSION

A system and method has been shown in the above embodiments for the effective implementation of a portable tripod riser. While various preferred embodiments have been shown and described, it will be understood that there is no intent to limit the invention by such disclosure, but rather, is intended to cover all modifications and alternate constructions falling within the spirit and scope of the invention as defined in the appended claims. For instance, the particular dimensions of the device should not be limited to that disclosed in the preferred embodiment. The unit can be made as large or small as desired depending on height and/or tripod extension needed. The specific shape of the supports or platform can be any such that the device would provide the function as described above. In addition, the particular materials used to construct the device need only meet the requirement of structural strength as cited above and be relatively light in weight (i.e. be portable).

I claim:

1. A portable tripod support platform which is collapsible into a folded non-use position for transporting comprising:

a first vertical support leg having an upper longitudinal recess;

a second vertical support leg having an upper longitudinal recess and pivotally connected to said first vertical support leg;

a third vertical support leg having an upper longitudinal recess and pivotally connected to said second vertical support leg;

a horizontal support platform pivotally connected to said third vertical support leg;

wherein said first, second, third supports are operatively connected and are equidistantly separated from each other during use and fold consecutively and against the preceding vertical support leg during non-use.

2. A portable tripod support platform as per claim 1 further comprising a handle attached to said third vertical support leg.

3. A portable tripod support platform as per claim 1 wherein said first, second and third vertical support legs and said horizontal support platform are secured together with a retaining pin while in a collapsed position.

4. A portable tripod support platform as per claim 1, wherein said horizontal support platform encapsulates a retractable support leg during non-use which extends downward during use to provide vertical support.

5. A portable tripod support platform as per claim 1 wherein said first, second and third vertical support legs and said horizontal support platform are connected by hinges.

6. A portable tripod support platform comprising:

a first rectangular vertical support leg;

a second rectangular vertical support leg pivotally connected to said first rectangular vertical support leg;

a third rectangular vertical support leg pivotally connected to said second rectangular vertical support leg;

a rectangular horizontal support platform pivotally connected to said third rectangular vertical support leg and having a retractable support leg;

each of said rectangular vertical support legs having a upper rectangular slot section for receiving one leg of said tripod, and wherein each of said rectangular vertical support legs may be separated an equidistance from each adjacent leg during use and folded together along with said rectangular horizontal support platform during non-use.

7. A portable tripod support platform as per claim 6 wherein each of said pivotal connections are hinges.

8. A portable tripod support platform as per claim 6 further comprising a handle attached to said third rectangular vertical support leg.

9. A portable tripod support platform as per claim 6 wherein said first, second and third rectangular vertical support legs and said horizontal support platform are secured together with a retaining pin while in a collapsed position.

10. A portable tripod support platform comprising:

a first rectangular vertical support leg;

a second rectangular vertical support leg connected by at least one hinge to said first rectangular vertical support leg;

a third rectangular vertical support leg connected by at least one hinge to said second rectangular vertical support leg;

a rectangular horizontal support platform connected by at least one hinge to said third rectangular vertical support leg and having a retractable support leg;

each of said rectangular vertical support legs having a upper rectangular slot section for receiving one leg of said tripod, and wherein each of said rectangular vertical support legs may be separated an equidistance from each adjacent leg during use and folded together along with said rectangular horizontal support platform during non-use.

11. A portable tripod support platform as per claim 10 further comprising a handle attached to said third rectangular vertical support leg.

12. A portable tripod support platform as per claim 10 wherein said first, second and third rectangular vertical support legs and said rectangular horizontal support platform are secured together with a retaining pin while in a collapsed position.

\* \* \* \* \*